US012429690B2

(12) United States Patent
Hagen et al.

(10) Patent No.: US 12,429,690 B2
(45) Date of Patent: Sep. 30, 2025

(54) PROJECTION ARRANGEMENT FOR A HEAD-UP DISPLAY (HUD) WITH P-POLARISED RADIATION

(71) Applicant: SAINT-GOBAIN GLASS FRANCE, Courbevoie (FR)

(72) Inventors: Jan Hagen, Bonn (DE); Klaus Fischer, Alsdorf (DE); Roberto Zimmermann, Solingen (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 469 days.

(21) Appl. No.: 18/007,663

(22) PCT Filed: Jun. 22, 2021

(86) PCT No.: PCT/EP2021/066909
§ 371 (c)(1),
(2) Date: Dec. 1, 2022

(87) PCT Pub. No.: WO2022/017707
PCT Pub. Date: Jan. 27, 2022

(65) Prior Publication Data
US 2023/0228991 A1 Jul. 20, 2023

(30) Foreign Application Priority Data
Jul. 20, 2020 (EP) .................................... 20186668

(51) Int. Cl.
*G02B 27/01* (2006.01)
*B32B 17/10* (2006.01)

(52) U.S. Cl.
CPC .... *G02B 27/0101* (2013.01); *B32B 17/10036* (2013.01); *B32B 17/1055* (2013.01);
(Continued)

(58) Field of Classification Search
CPC ............ C03C 17/3626; C03C 17/3639; C03C 17/3652; C03C 17/3644; G02B 27/0101;
(Continued)

(56) References Cited

U.S. PATENT DOCUMENTS

2007/0020465 A1 * 1/2007 Thiel .................. C03C 17/3673
428/428
2007/0082219 A1 4/2007 Fleury et al.
(Continued)

FOREIGN PATENT DOCUMENTS

DE 10 2014 220189 A1 4/2016
EP 1 880 243 A2 1/2008
(Continued)

OTHER PUBLICATIONS

International Search Report as issued in International Patent Application No. PCT/EP2021/066909, dated Sep. 30, 2021.
(Continued)

Primary Examiner — Thomas K Pham
Assistant Examiner — Ruby L Kauffman
(74) Attorney, Agent, or Firm — Pillsbury Winthrop Shaw Pittman LLP

(57) ABSTRACT

A projection arrangement for a head-up display (HUD), includes a composite pane, which includes an outer pane and an inner pane joined to one another via a thermoplastic intermediate layer and has an HUD region; an electrically conductive coating on the surface of the outer pane or the inner pane facing the intermediate layer or within the intermediate layer; and an HUD projector, which is directed at the HUD region; wherein the radiation of the projector is p-polarised, wherein the electrically conductive coating includes a first dielectric layer or layer sequence, a first electrically conductive layer, a second dielectric layer or layer sequence, a second electrically conductive layer, a
(Continued)

Figure 1:
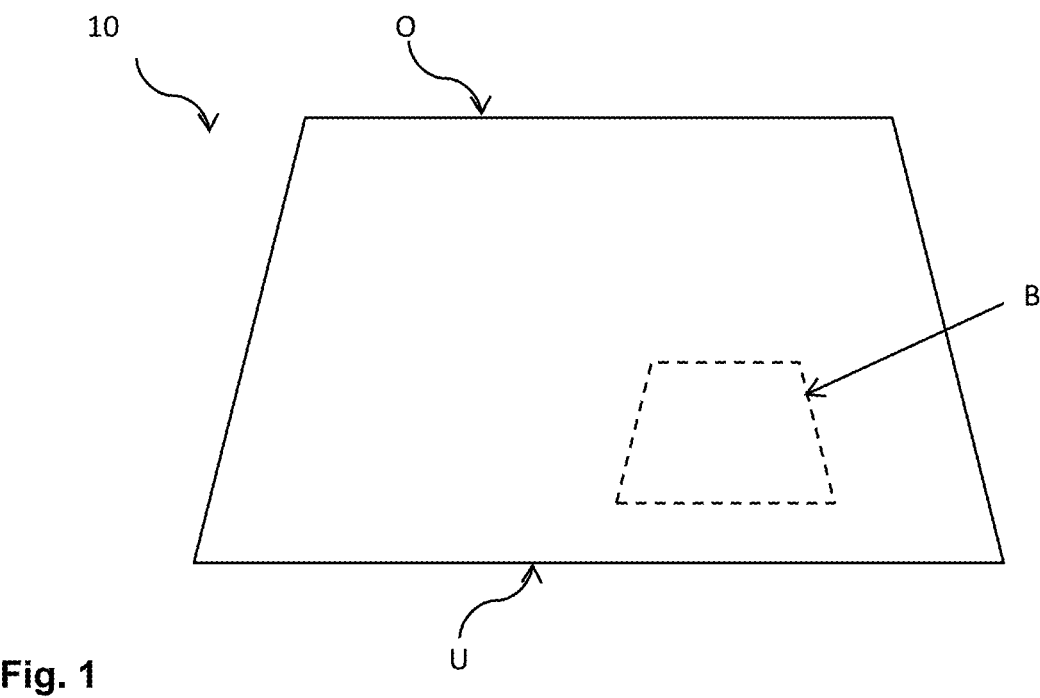

third dielectric layer or layer sequence, a third electrically conductive layer, a fourth dielectric layer or layer sequence, a fourth electrically conductive layer, and a fifth dielectric layer or layer sequence.

20 Claims, 4 Drawing Sheets

(52) U.S. Cl.
CPC ..... *B32B 2255/205* (2013.01); *B32B 2255/28* (2013.01); *B32B 2605/00* (2013.01); *G02B 2027/0118* (2013.01)

(58) Field of Classification Search
CPC .... G02B 2027/0118; G02B 2027/0194; B32B 17/10036; B32B 17/1055; B32B 2255/205; B32B 2255/28; B32B 2605/00; B32B 17/10229; B32B 17/10458
See application file for complete search history.

(56) References Cited

U.S. PATENT DOCUMENTS

| | | | | |
|---|---|---|---|---|
| 2012/0177900 | A1* | 7/2012 | Laurent | C03C 17/3639 428/213 |
| 2014/0232707 | A1* | 8/2014 | Alschinger | G09G 5/10 345/207 |
| 2015/0004383 | A1* | 1/2015 | Sandre-Chardonnal | C03C 17/361 428/213 |
| 2018/0348513 | A1* | 12/2018 | Fischer | B32B 17/10761 |
| 2019/0023610 | A1* | 1/2019 | Fischer | C03C 17/3626 |

FOREIGN PATENT DOCUMENTS

| | | |
|---|---|---|
| EP | 1 800 855 B1 | 2/2013 |
| WO | WO 03/024155 A2 | 3/2003 |
| WO | WO 2006/122305 A2 | 11/2006 |
| WO | WO 2009/071135 A1 | 6/2009 |
| WO | WO 2013/104438 A1 | 7/2013 |
| WO | WO 2013/104439 A1 | 7/2013 |
| WO | WO 2017/198363 A1 | 11/2017 |
| WO | WO 2019/179683 A1 | 9/2019 |
| WO | WO 2020/083649 A1 | 4/2020 |
| WO | WO 2020/094422 A1 | 5/2020 |
| WO | WO 2020/094423 A1 | 5/2020 |
| WO | WO 2021/004685 A1 | 6/2021 |
| WO | WO 2021/104800 A1 | 6/2021 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=1079689&change_language=en<. (English abstract on p. 5 of document).

* cited by examiner

PROJECTION ARRANGEMENT FOR A HEAD-UP DISPLAY (HUD) WITH P-POLARISED RADIATION

CROSS-REFERENCE TO RELATED APPLICATIONS

This application is the U.S. National Stage of PCT/EP2021/066909, filed Jun. 22, 2021, which in turn claims priority to European patent application number 20186668.8 filed Jul. 20, 2020. The content of these applications are incorporated herein by reference in their entireties.

The invention relates to a projection arrangement for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the drivers field of vision, for example, the current driving speed, navigation or warning messages, which the driver can perceive without having to divert his glance from the road. Head-up displays can thus contribute significantly to an increase in traffic safety.

HUD projectors are predominantly operated with s-polarised radiation and irradiate the windshield at an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection arrangements that work with windshields without wedge films. For example, it is possible to operate the HUD projector with p-polarised radiation, which is not significantly reflected by the pane surfaces. Instead, the windshield has an electrically conductive coating as a reflection surface for the p-polarised radiation. DE102014220189A1 discloses such an HUD projection arrangement that is operated with p-polarised radiation. Proposed, among other things, as a reflecting structure is a single metallic layer with a thickness of 5 nm to 9 nm, made, for example, of silver or aluminium.

Also known are more complex electrically conductive coatings for windshields, which can, for example, be used as IR-reflective coatings (sun protection coatings) to reduce the heating of the vehicle interior and thus improve thermal comfort. The coatings can, however, also be used as heatable coatings by connecting them to a voltage source such that a current flows through the coating. Suitable coatings include conductive metallic layers, in particular, based on silver. Since these layers are susceptible to corrosion, it is customary to apply them on the surface of the outer pane or the inner pane facing the intermediate layer such that they have no contact with the atmosphere. Silver-containing transparent coatings are known, for example, from WO03/024155, US2007/0082219A1, US2007/0020465A1, WO2013/104438, or WO2013/104439.

Although these known IR-reflecting coatings can, in principle, be used as reflection coatings for an HUD, this generally does not lead to entirely satisfactory results. An HUD reflection coating must, in fact, comply with further requirements, in particular the highest and most uniform reflectance possible in the range of the projector radiation in order to provide a high intensity and colour-neutral HUD projection.

WO2017198363A1 proposes a coating with four silver layers for an HUD with s-polarised radiation. However, the reflection behaviour requirements are different when using s-polarised radiation than when using p-polarised radiation. WO2019179683A1 and WO2020094422A1 propose coatings with four silver layers for an HUD with p-polarised radiation. Although these coatings are optimised for their reflection behaviour relative to p-polarised radiation, each has a very thin silver layer which can cause so-called dewetting problems during heat treatment, which can result in island-like accumulation of the silver instead of a homogeneous layer. WO2021004685A1 and WO2021104800A1 propose coatings with a single silver layer for an HUD with p-polarised radiation. However, these have relatively low reflectivity relative to IR radiation and relatively high sheet resistance. Consequently, although the coatings result in good reflection of the HUD radiation, they can only be used to a limited extent as sun protection coatings or heatable coatings.

Thus, the conductive coatings known to date suffer from certain disadvantages related either to the reflection properties for p-polarised HUD radiation or to the sun protection properties or to the stability of the layer structure. There is a need for further improved coatings that overcome these disadvantages.

The object of the invention is to provide an improved projection arrangement for a head-up display. The composite pane of the projection arrangement should work without a wedge film and have an electrically conductive coating that is stable and can also be used as a sun protection coating and/or as a heatable coating. The HUD projection should be generated with high intensity and the composite pane should have a pleasant appearance.

The object of the present invention is accomplished according to the invention by a projection arrangement in accordance with claim 1. Preferred embodiments are apparent from the dependent claims.

According to the invention, p-polarised radiation is used for generating the HUD image, and the composite pane has an electrically conductive coating that sufficiently reflects p-polarised to radiation. Since the angle of incidence of about 65° typical for HUD projection arrangement is relatively close to Brewster's angle for an air/glass transition (56.5°, soda lime glass), p-polarised radiation is hardly reflected by the pane surfaces, but instead primarily by the conductive coating. Consequently, ghost images do not occur or are hardly perceptible such that the use of an expensive wedge film can be dispensed with. The coating has high and uniform reflectance relative to p-polarised radiation, ensuring a high-intensity and colour-neutral HUD display. At the same time, the coating has high reflectivity relative to IR radiation, thus effectively reducing the energy input into the vehicle from sunlight. Likewise, the coating has low sheet resistance such that it can also be used as a heatable coating using the on-board voltage of conventional vehicles (14V). The individual conductive layers of the coating are sufficiently thick to ensure stability of the layer structure, whereas very thin conductive layers could lead to dewetting of the layer structure. Also, the optical requirements for a windshield can be met, in particular in terms of transparency and colouring. These are major advantages of the present invention.

The projection arrangement according to the invention for a head-up display (HUD) includes at least a composite pane with an electrically conductive coating and a projector (HUD projector). As is usual with HUDs, the projector irradiates a region of the windshield where the radiation is reflected in the direction of the viewer (driver), generating a virtual image, which the viewer perceives, from his perspective, as behind the windshield. The region of the composite pane that can be or is irradiated by the projector is referred to as an HUD region.

The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by adjustment of the mirrors, with the entire area thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The composite pane comprises an outer pane and an inner pane that are joined to one another via a thermoplastic intermediate layer. The composite pane is intended, in a window opening, in particular the window opening of a vehicle, to separate the interior from the external surroundings. In the context of the invention, the term "inner pane" refers to the pane of the composite pane facing the interior (in particular, vehicle interior). The term "outer pane" refers to the pane facing the external surroundings.

The composite pane according to the invention is preferably a windshield (front pane) of a vehicle on land, in the water, or in the air, in particular the windshield of a motor vehicle, for example, a passenger car or a lorry, or the front pane of an aircraft, watercraft, or rail vehicle, in particular a train. HUDs, in which the projector radiation is reflected on a windshield to produce an image perceptible for the driver (viewer), are quite common. In principle, however, it is also conceivable to project the HUD projection onto other panes, in particular vehicle windows, for example, onto a side window or a rear window. For example, the HUD of a side window can be used to note people or other vehicles with which a collision threatens, provided their position is detected by cameras or other sensors. An HUD of a rear window can provide information for the driver when moving in reverse.

The composite pane has an upper edge and a lower edge as well as two side edges extending therebetween. "Upper edge" refers to that edge that is intended to point upward in the installed position. "Lower edge" refers to that edge that is intended to point downward in the installed position. In the case of a windshield, the upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The composite pane has an electrically conductive coating, in particular a transparent electrically conductive coating. The electrically conductive coating is preferably applied to one of the surfaces of the two panes facing the intermediate layer, i.e., the interior-side surface of the outer pane or the exterior-side surface of the inner pane. Alternatively, the electrically conductive coating can also be arranged within the thermoplastic intermediate layer, for example, applied to a carrier film that is arranged between two thermoplastic bonding films. The conductive coating can, for example, be provided as an IR-reflecting sun protection coating or also as a heatable coating that is electrically contacted and heats up when current flows through it. The term "transparent coating" means a coating that has average transmittance in the visible spectral range of at least 70%, preferably at least 75%, which thus does not substantially restrict vision through the pane. Preferably, at least 80% of the pane surface is provided with the coating according to the invention. In particular, the coating is applied to the pane surface over its entire surface with the exception of a peripheral edge region and, optionally, a local region that are intended to ensure the transmittance of electromagnetic radiation through the composite pane as communication windows, sensor windows, or camera windows, and, consequently, are not provided with the coating. The peripheral uncoated edge region has, for example, a width of up to 20 cm. It prevents direct contact of the coating with the surrounding atmosphere such that the coating is protected, in the interior of the composite pane, against corrosion and damage.

The electrically conductive coating is a layer stack or a layer sequence, in particular composed of thin layers, comprising a plurality of electrically conductive, in particular metal-containing layers, wherein each electrically conductive layer is in each case arranged between two dielectric layers or layer sequences. The coating is thus a thin-film stack having n electrically conductive layers and (n+1) dielectric layers or layer sequences, where n is a natural number and wherein, on a lower dielectric layer or layer sequence, a conductive layer and a dielectric layer or layer sequence follows alternatingly in each case. Such coatings are known as sun protection coatings and heatable coatings, wherein the electrically conductive layers are typically based on silver.

The electrically conductive coating according to the invention has at least four electrically conductive layers. Said natural number n is thus at least 4. The coating comprises at least the following layers or layer sequences, which are arranged in the order specified starting from the substrate, on which the coating is deposited (i.e., in particular the outer pane, the inner pane, or a carrier film in the intermediate layer):

a first dielectric layer or layer sequence,
a first electrically conductive layer,
a second dielectric layer or layer sequence,
a second electrically conductive layer,
a third dielectric layer or layer sequence,
a third electrically conductive layer,
a fourth dielectric layer or layer sequence,
a fourth electrically conductive layer, and
a fifth dielectric layer or layer sequence.

The coating according to the invention can include further electrically conductive layers and dielectric layers or layer sequences that are arranged above the fifth dielectric layer or layer sequence (n>4). In a particularly preferred embodiment, however, said natural number n is exactly 4. More complex layer structures are in principle not necessary for achieving the required specifications of the coatings. However, other metal-containing layers can be present that do not contribute substantially to the electrical conductivity of the reflection coating but serve a different purpose. This applies in particular to metallic blocking layers with geometric thicknesses of less than 1 nm, which are preferably arranged between the silver layer and the dielectric layer sequences.

The advantageous properties of the coating according to the invention are achieved in particular by a specific selection of the layer thicknesses of the electrically conductive layers. According to the invention, the layer thickness
of the first electrically conductive layer is from 11 nm to 14 nm,
of the second electrically conductive layer is from 10 nm to 13 nm,
of the third electrically conductive layer is from 10 nm to 13 nm,
of the fourth electrically conductive layer is from 7 nm to 11 nm.

The thickness of the first electrically conductive layer is preferably greater than the thickness of the fourth electrically conductive layer. It is further preferred for the thickness of the second and the third electrically conductive layer to be, in each case, greater than the thickness of the fourth electrically conductive layer. Particularly good results are achieved in this way. It can also be preferable for the thickness of the first electrically conductive layer to be greater than the thickness of the second electrically conductive layer.

The specification of layer thicknesses or thicknesses refers, unless otherwise indicated, to the geometric thicknesses of a layer. The thickness of the first electrically conductive layer is preferably from 11.5 nm to 13.5 nm, in particular from 12 nm to 13 nm. The thickness of the second electrically conductive layer is preferably from 10 nm to 12.5 nm, in particular from 10 nm to 12 nm. The thickness of the third electrically conductive layer is preferably from 11 nm to 12.5 nm. The thickness of the fourth electrically conductive layer is preferably from 7.5 nm to 10 nm, in particular from 7.5 nm to 9.5 nm. Particularly good results are thus achieved.

The functional, electrically conductive layers are responsible for the electrical conductivity of the coating. Each electrically conductive layer preferably contains at least one metal or one metal alloy and is particularly preferably based on the metal or the metal alloy, in other words, consists substantially of the metal or the metal alloy apart from any dopants or impurities. Preferably, the electrically conductive layers are based on silver (Ag) or a silver-containing alloy. In an advantageous embodiment, the electrically conductive layer contains at least 90 wt.-% silver, preferably at least 99 wt.-% silver, particularly preferably at least 99.9 wt.-% silver. The silver layers can have dopants, for example, paladium, gold, copper, or aluminium.

The advantageous reflection properties relative to the HUD projector radiation are provided in particular by the thicknesses of the electrically conductive layers according to the invention. They can be further optimised by the dielectric layers or layer sequences, their optical thickness being particularly influential. The optical thickness is the product of the refractive index and the geometric thickness. In particular, the optical thicknesses of the first and the fifth dielectric layer or layer sequence have a major influence. The optical thickness of the first dielectric layer or layer sequence is preferably from 50 nm to 150 nm, particularly preferably from 80 nm to 120 nm, most particularly preferably from 90 nm to 110 nm, in particular from 95 nm to 105 nm. The optical thickness of the fifth dielectric layer or layer sequence is preferably from 50 nm to 150 nm, particularly preferably from 70 nm to 110 nm, most particularly preferably from 75 nm to 95 nm, in particular from 80 nm to 90 nm. The optical thicknesses of the second, third, and fourth ("intermediate") dielectric layers or layer sequences are, independently of one another, preferably from 100 nm to 200 nm, particularly preferably from 120 nm to 180 nm, most particularly preferably from 150 nm to 170 nm.

In one embodiment of the invention, all dielectric layers have a refractive index greater than 1.8, preferably greater than 1.9. In other words, all dielectric layers or layer sequences are formed exclusively from dielectric layers with a refractive index greater than 1.8. Good results are thus obtained. The dielectric layers can, for example, be based on silicon nitride, mixed silicon-metal nitrides (such as silicon-zirconium nitride (SiZrN), mixed silicon-aluminium nitride, mixed silicon-hafnium nitride, or mixed silicon-titanium nitride), aluminium nitride (AlN), tin oxide (SnO), manganese oxide (MnO), tungsten oxide ($WO_3$), niobium oxide ($Nb_2O_5$), bismuth oxide ($Bi_2O_3$), titanium oxide ($TiO_2$), zinc oxide (ZnO), or mixed tin-zinc oxide (SnZnO). The preferred ranges indicated above for the optical thickness of the dielectric layers or layer sequences apply in particular to those dielectric layers or layer sequences that exclusively include layers with a refractive index greater than 1.8.

In the context of the present invention, refractive indices are in principle indicated in relation to a wavelength of 550 nm. The refractive index can, for example, be determined by means of ellipsometry. Ellipsometers are commercially available, for example, from the company Sentech.

The materials mentioned in the present description can be deposited stoichiometrically, substoichiometrically, or superstoichiometrically. The materials can have dopants, in particular the aluminium, boron, zirconium, or titanium. The dopants can provide inherently dielectric materials with a certain electrical conductivity. The person skilled in the art will nevertheless identify them as dielectric layers in terms of their function, as is usual in the field of thin layers. The material of the dielectric layers preferably has electrical conductivity (reciprocal of specific resistance) of less than $10^{-4}$ S/m. The material of the electrically conductive layers preferably has electrical conductivity greater than $10^4$ S/m.

In a preferred embodiment, at least one of the dielectric layer sequences contains a dielectric layer with a refractive index less than 1.8, preferably less than 1.6, which can also be referred to as a low-refractive-index layer. Said layer sequence also preferably contains one or more dielectric layers with a refractive index greater than 1.8. The optical thickness of the low-refractive-index layer is preferably from 20 nm to 40 nm, particularly preferably from 25 nm to 35 nm. The low-refractive-index layer is preferably based on silicon oxide, and can additionally contain dopants (for example, aluminium, boron, or antimony) or impurities. The dielectric layer sequence with the low-refractive-index layer is preferably arranged between two electrically conductive layers, in particular between the first and the second electrically conductive layer. Surprisingly, it has been demonstrated that by means of such a dielectric layer sequence, the reflectance relative to p-polarised projector radiation in the relevant spectral range from 450 nm to 650 nm can be substantially increased. The sum of the optical thicknesses of all layers with a refractive index greater than 1.8 of said layer sequence preferably corresponds to the above mentioned values, is thus preferably from 100 nm to 200 nm, particularly preferably from 120 nm to 180 nm, most particularly preferably from 150 nm to 170 nm. The sum of the optical thicknesses of all layers with a refractive index greater than 1.8 of said layer sequence is particularly preferably from 150 nm to 160 nm. The total optical thickness of said layer sequence is preferably from 150 nm to 220 nm, particularly preferably from 170 nm to 200 nm, most particularly preferably from 180 nm to 190 nm. The remaining dielectric layers or layer sequences are preferably formed exclusively from dielectric layers with a refractive index greater than 1.8, with an optical thicknesses of, in each case, preferably from 100 nm to 200 nm, particularly preferably from 120 nm to 180 nm, most particularly preferably from 150 nm to 170 nm.

The electrically conductive coating according to the invention has IR-reflecting properties such that it functions as a sun protection coating that reduces the heating of the vehicle interior by reflecting thermal radiation. The TTS value of the composite pane provided with the coating is preferably less than 50%, particularly preferably less than 45%. The "TTS value" refers to the total incident solar energy, measured per ISO 13837, —a measure of thermal comfort. The coating can also be used as a heating coating when it is electrically contacted such that a current flows through it, heating the coating. The sheet resistance of the coating is preferably less than 1 Ω/square, in particular less than 0.9 Ω/square.

The spectral range from 450 nm to 650 nm is, in particular, decisive for the reflection properties with respect to the HUD projector because the radiation of typical projectors is situated in this spectral range, in particular with the primary wavelengths 473 nm, 550 nm, and 630 nm (RGB). The reflectance should be as high as possible in this spectral range in order to ensure a high-intensity HUD image. The composite pane provided with the electrically conductive coating preferably has, in the spectral range from 450 nm to 650 nm, an averaged reflectance relative to p-polarised radiation of at least 5%, particularly preferably of at least 7%.

Reflectance describes the proportion of the total incident radiation that is reflected. It is indicated in % (based on 100% incident radiation) or as a unitless number from 0 to 1 (normalised to the incident radiation). Plotted as a function of the wavelength, it forms the reflection spectrum. In the context of the present invention, the statements concerning reflectance relative to p-polarised radiation are based on the reflectance measured with an angle of incidence of 65° relative to the interior-side surface normal, which corresponds approx. to the irradiation by conventional projectors. The data regarding the reflectance or the reflection spectrum are based on a reflection measurement with a light source that emits uniformly with a normalised radiation intensity of 100% in the spectral range under consideration.

In order to achieve the most colour-neutral display of the projector image possible, the reflection spectrum should be as smooth as possible and should have no pronounced local minima and maxima. In the spectral range from 450 nm to 650 nm, the difference between the maximally occurring reflectance and the mean of the reflectance as well as the difference between the minimally occurring reflectance and the mean of the reflectance in a preferred embodiment should be at most 5%. Here again, the reflectance relative to p-polarised radiation is measured with an angle of incidence of 65° relative to the interior-side surface normal. The difference indicated is to be considered as the absolute deviation of reflectance (reported in %), not as a percentage deviation relative to the mean. The indicated smoothness of the reflection spectrum can easily be achieved with the electrically conductive coating according to the invention.

The above-mentioned desired reflection characteristics are achieved in particular through the choice of the materials and thicknesses of the individual layers as well as the structure of the dielectric layer sequence. The electrically conductive coating can thus be suitably adjusted.

The projector (HUD projector) is directed at the HUD region of the composite pane. The projector is arranged on the interior-side of the composite pane and irradiates the composite pane via the interior-side surface of the inner pane. According to the invention, the radiation of the projector is at least partially p-polarised, i.e., has at least one p-polarised component. The proportion of p-polarised radiation is preferably at least 80%. The radiation of the projector is preferably completely or almost completely p-polarised (essentially purely p-polarised). The p-polarised radiation proportion is 100% or deviates only insignificantly therefrom. This produces a particularly high-intensity HUD image and ghost images can be avoided. The indication of the polarisation direction is based here on the plane of incidence of the radiation on the composite pane. The expression "p-polarised radiation" refers to radiation whose electric field oscillates in the plane of incidence. "S-polarised radiation" refers to radiation whose electric field oscillates perpendicular to the plane of incidence. The plane of incidence is spanned by the vector of incidence and the surface normal of the composite pane at the point within the HUD region, preferably in the geometric centre of the HUD region. Due to the usual curvature of the pane in the vehicle sector, which affects the plane of incidence and thus the definition of the polarisation, the ratio of p-polarised radiation to s-polarised radiation can be different from this reference point at other locations.

The p-polarised radiation emitted by the projector irradiates the HUD region to generate the HUD projection during operation of the HUD. The radiation of the projector is in the visible spectral range of the electromagnetic spectrum—typical HUD projectors operate with the wavelengths 473 nm, 550 nm, and 630 nm (RGB). Since the angle of incidence typical for HUD projection arrangements is relatively close to the Brewster angle for an air/glass transition (56.5° to 56.6°, soda lime glass, $n_2$=1.51-1.52), p-polarised radiation is hardly reflected by the pane surfaces. Ghost images due to reflection at the interior-side surface of the inner pane and the exterior-side surface of the outer pain thus occur only with low intensity. In addition to avoiding the ghost images, the use of p-polarised radiation also has the advantage that the HUD image is recognisable to wearers of polarisation-selective sunglasses, which typically allow only p-polarised radiation to pass and block s-polarised radiation.

The radiation of the projector preferably strikes the composite pane at an angle of incidence from 45° to 70°, in particular from 60° to 70°. In an advantageous embodiment, the angle of incidence deviates from Brewster's angle by at most 10°. The p-polarised radiation is then reflected only insignificantly at the surface of the composite pane such that no ghost image is generated. The angle of incidence is the angle between the vector of incidence of the projector radiation and the interior-side surface normal (i.e., the surface normal on the interior-side external surface of the composite pane) in the geometric centre of the HUD region. Ideally, the angle of incidence should be as close as possible to Brewster's angle. However, angles of incidence of 65°, which are common for HUD projection arrangements, are easily implemented in vehicles, and deviate only slightly from Brewster's angle can, for example, also be used such that the reflection of the p-polarised radiation increases only insignificantly.

Since the reflection of the projector radiation occurs substantially at the reflection coating and not at the external pane surfaces, it is not necessary to arrange the external pane surfaces at an angle relative to one another in order to avoid ghost images. "The external pane surfaces" refers here to the surfaces of the individual panes facing away from one another, i.e., the exterior-side surface of the outer pane and the interior-side surface of the inner pane. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the composite pane, just like the inner pane and the outer pane. A wedge-like intermediate layer would, in contrast, have a variable thickness, in particular an increasing thickness, in the vertical course between the lower edge and the upper edge of the side window. The intermediate layer is typically formed from at least one thermoplastic film. Since standard films are significantly more economical than wedge films, the production of the composite pane is more economical.

The reflection properties of the conductive coating relative to the radiation of the HUD projector are primarily influenced by the material and the layer thickness of the conductive layers and the optical thickness of the dielectric layers or layer sequences. However, the properties of the coating can be further optimised by a suitable design of the dielectric layer sequences, for example, in terms of sheet resistance or transparency. In a preferred embodiment, dielectric layer sequences composed of a plurality of dielectric layers are present in each case between adjacent conductive layers and above the uppermost conductive layer and below the lowest conductive layer, and no individual dielectric layers are present.

In an advantageous embodiment, each dielectric layer or layer sequence contains an anti-reflection layer. The anti-reflection layers reduce the reflection of visible light and thus increase the transparency of the coated pane. The anti-reflection layers are formed, for example, on the basis of silicon nitride (SiN), mixed silicon-metal nitrides such as silicon-zirconium nitride (SiZrN), aluminium nitride (AlN), or tin oxide (SnO). Moreover, the anti-reflection layers can have dopants. The anti-reflection layers preferably have thicknesses from 10 nm to 100 nm, particularly preferably from 20 nm to 50 nm.

The anti-reflection layers can in turn be subdivided into at least two sublayers, in particular into a dielectric layer having a refractive index less than 2.1 and an optically high-refractive-index layer having a refractive index greater than or equal to 2.1. Preferably, at least one anti-reflection layer arranged between two electrically conductive layers is subdivided in this way. Subdividing the anti-reflection layer results in lower sheet resistance of the electrically conductive coating with, at the same time, high transmittance and high colour neutrality. The order of the two sublayers can, in principle, be selected arbitrarily, with the optically high-refractive-index layer preferably arranged above the dielectric layer, which is particularly advantageous in terms of the sheet resistance. The thickness of the optically high-refractive-index layer is preferably from 10% to 99%, particularly preferably from 25% to 75% of the total thickness of the anti-reflection layer, most particularly preferably from 40% to 60%.

The optically high-refractive-index layer with a refractive index greater than or equal to 2.1 contains, for example, MnO, $WO_3$, $Nb_2O_5$, $Bi_2O_3$, $TiO_2$, $Zr_3N_4$, and/or AlN, preferably a mixed silicon-metal nitride, for example, mixed silicon-hafnium nitride, or mixed silicon-titanium nitride, particularly preferably mixed silicon-zirconium nitride (SiZrN). This is particularly advantageous in terms of the sheet resistance of the electrically conductive coating. The mixed silicon-zirconium nitride preferably has dopants. The layer of an optically high-refractive-index material can, for example, contain an aluminium-doped mixed silicon-zirconium nitride. The proportion of zirconium is preferably between 15 and 45 wt.-%, particularly preferably between 15 and 30 wt.-%.

The dielectric layer with a refractive index less than 2.1 preferably has a refractive index between 1.6 and 2.1, particularly preferably between 1.9 and 2.1. The dielectric layer preferably contains at least one oxide, for example, tin oxide, and/or one nitride, particularly preferably silicon nitride.

In an advantageous embodiment, one or a plurality of dielectric layer sequences has/have a first matching layer, preferably each dielectric layer sequence that is arranged below an electrically conductive layer. The first matching layer is preferably arranged above the anti-reflection layer. The first matching layer is preferably arranged directly below the electrically conductive layer such that it has direct contact with the conductive layer. This is particularly advantageous in terms of the crystallinity of the electrically conductive layer.

In an advantageous embodiment, one or more dielectric layer sequences has/have a smoothing layer, preferably each dielectric layer sequence that is arranged between two electrically conductive layers, particularly preferably additionally the lowest dielectric layer sequence (first dielectric layer sequence). The smoothing layer is arranged below one of the first matching layers, preferably between the anti-reflection layer and the first matching layer, if such a first matching layer is present. The smoothing layer preferably makes direct contact with the first matching layer The smoothing layer is responsible for optimisation, in particular smoothing, of the surface for an electrically conductive layer subsequently applied above it. An electrically conductive layer deposited on a smoother surface has higher transmittance with, at the same time, lower sheet resistance. The layer thickness of a smoothing layer is preferably from 5 nm to 20 nm, particularly preferably from 7 nm to 12 nm. The smoothing layer preferably has a refractive index of less than 2.2.

The smoothing layer preferably contains at least one non-crystalline oxide. The oxide can be amorphous or partially amorphous (and thus partially crystalline) but is not completely crystalline. The non-crystalline smoothing layer has low roughness and thus forms an advantageously smooth surface for the layers to be applied above the smoothing layer. The non-crystalline smoothing layer is further responsible for an improved surface structure of the layer deposited directly above the smoothing layer, which is preferably the first matching layer. The smoothing layer can contain, for example, at least one oxide of one or more of the elements tin, silicon, titanium, zirconium, hafnium, zinc, gallium, and indium. The smoothing layer particularly preferably contains a non-crystalline mixed oxide. The smoothing layer most particularly preferably contains a mixed tin-zinc oxide (ZnSnO). The mixed oxide can have dopants. The smoothing layer can contain, for example, an antimony-doped mixed tin-zinc oxide. The mixed oxide preferably has substoichiometric oxygen content. The tin content is preferably between 10 and 40 wt.-%, particularly preferably between 12 and 35 wt.-%.

In an advantageous embodiment, one or more dielectric layer sequences, preferably each dielectric layer sequence, has/have a second matching layer that is arranged above an electrically conductive layer. The second matching layer is preferably arranged below the anti-reflection layer.

The first and the second matching layers are responsible for an improvement of the sheet resistance of the coating. The first matching layer and/or the second matching layer preferably contains zinc oxide $ZnO_{1-\delta}$ with $0<\delta<0.01$. The first matching layer and/or the second matching layer further preferably contains dopants. The first matching layer and/or the second matching layer can, for example, contain aluminium-doped zinc oxide (ZnO:Al). The zinc oxide is preferably deposited substoichiometrically with respect to oxygen in order to avoid a reaction of excess oxygen with the silver-containing layer. The layer thicknesses of the first matching layer and the second matching layer are preferably from 5 nm to 20 nm, particularly preferably from 10 nm to 20 nm.

In an advantageous embodiment, the electrically conductive coating includes one or more blocking layers. Preferably, at least one blocking layer is associated with at least one, particularly preferably with each electrically conductive layer. The blocking layer makes direct contact with the electrically conductive layer and is arranged immediately above or immediately below the electrically conductive layer. In other words, no other layer is arranged between the electrically conductive layer and the blocking layer. A blocking layer can also be arranged immediately above and immediately below a conductive layer in each case. The blocking layer preferably contains niobium, titanium, nickel, chromium, and/or alloys thereof, particularly preferably nickel-chromium alloys. The layer thickness of the blocking layer is preferably from 0.1 nm to 1 nm, particularly preferably from 0.1 nm to 0.5 nm. A blocking layer immediately below the electrically conductive layer serves in particular to stabilise the electrically conductive layer during a temperature treatment and improves the optical quality of the electrically conductive coating. A blocking layer immediately above the electrically conductive layer prevents contact of the sensitive electrically conductive layer with the oxidising reactive atmosphere during the deposition of the following layer by reactive cathodic sputtering, for example, of the second matching layer.

When a dielectric layer sequence contains a low-refractive-index layer with a refractive index less than 1.8, this low-refractive-index layer is preferably arranged between the anti-reflection layer and the electrically conductive layer positioned above it, in particular between the anti-reflection layer and the smoothing layer positioned above it.

When a layer is based on a material, the layer consists for the most part of this material in addition to any impurities or dopants. In the context of the invention, if a first layer is arranged "above" a second layer, this means that the first layer is arranged farther from the substrate on which the coating is applied than the second layer. In the context of the invention, if a first layer is arranged "beneath" a second layer, this means that the second layer is arranged farther from the substrate than the first layer. In the context of the invention, if a first layer is arranged "above or below" a second layer, this does not necessarily mean that the first and the second layer are in direct contact with one another. One or more additional layers can be arranged between the first and the second layer provided this is not explicitly ruled out.

In an advantageous embodiment, a dielectric layer sequence is in each case arranged between two electrically conductive layers, which dielectric layer sequence comprises:
  an anti-reflection layer based on silicon nitride, mixed silicon-metal nitrides such as silicon-zirconium nitride, aluminium nitride, or tin oxide,
  a smoothing layer based on an oxide of one or more of the elements tin, silicon, titanium, zirconium, hafnium, zinc, gallium, and indium,
  a first and a second matching layer based on zinc oxide, and
  optionally, a blocking layer based on niobium, titanium, nickel, chromium, and/or alloys thereof. A specific order of the layers is not required. An anti-reflection layer and a matching layer based on the above-mentioned preferred materials are preferably arranged below the lowest conductive layer and above the uppermost conductive layer.

The electrically conductive coating with the reflection characteristics according to the invention can, in principle, be implemented in various ways, preferably using the above-described layers such that the invention is not restricted to a specific layer sequence. In the following, a particularly preferred embodiment of the coating is presented, with which particularly good results are achieved, in particular with a typical angle of incidence of the radiation of about 65°.

A particularly preferred embodiment of the electrically conductive coating contains or consists of the following layer sequence, starting from the substrate:
  an anti-reflection layer with a thickness from 10 nm to 30 nm, preferably from 15 nm to 25 nm, particularly preferably from 18 nm to 23 nm, preferably based on a mixed silicon-metal nitride such as silicon-zirconium nitride or silicon-hafnium nitride,
  a smoothing layer with a thickness from 5 nm to 15 nm, preferably from 5 nm to 10 nm, preferably based on mixed tin-zinc oxide,
  a first matching layer with a thickness from 5 nm to 15 nm, preferably from 8 nm to 12 nm, preferably based on zinc oxide,
  an electrically conductive layer based on silver with a thickness from 11 nm to 14 nm, preferably from 11.5 nm to 13.5 nm,
  optionally, a blocking layer with a thickness from 0.1 nm to 0.5 nm, preferably based on NiCr,
  a second matching layer with a thickness from 10 nm to 20 nm, preferably from 14 nm to 18 nm, preferably based on zinc oxide, an anti-reflection layer with a thickness from 20 nm to 40 nm, preferably from 25 nm to 35 nm, particularly preferably from 30 nm to 35 nm, preferably based on a mixed silicon-metal nitride such as silicon-zirconium nitride or silicon-hafnium nitride, optionally, a low-refractive-index layer with a refractive index of less than 1.8, with a thickness from 5 nm to 50 nm, preferably from 10 nm to 30 nm, particularly preferably from 15 nm to 25 nm, preferably based on silicon oxide, a smoothing layer with a thickness from 5 nm to 15 nm, preferably from 8 nm to 12 nm, preferably based on mixed tin-zinc oxide, a first matching layer with a thickness from 10 nm to 20 nm, preferably from 13 nm to 18 nm, preferably based on zinc oxide, an electrically conductive layer based on silver with a thickness from 10 nm to 13 nm, preferably from 10 nm to 12.5 nm, optionally, a blocking layer with a thickness from 0.1 nm to 0.5 nm, preferably based on NiCr, a second matching layer with a thickness from 10 nm to 20 nm, preferably from 13 nm to 18 nm, preferably based on zinc oxide, an anti-reflection layer with a thickness from 25 nm to 45 nm, preferably from 30 nm to 40 nm, preferably subdivided into a dielectric layer based on silicon nitride with a thickness from 15 nm to 20 nm, and an optically high-refractive-index layer based on a mixed silicon-metal nitride such as silicon-zirconium nitride or silicon-hafnium nitride with a thickness from 15 nm to 20 nm, a smoothing layer with a thickness from 5 nm to 15 nm, preferably from 8 nm to 12 nm, preferably based on mixed tin-zinc oxide, a first matching layer with a thickness from 10 nm to 20 nm, preferably from 12 nm to 17 nm, preferably based on zinc oxide, an electrically conductive layer based on silver with a thickness from 10 nm to 13 nm, preferably from 11 nm to 12.5 nm, optionally, a blocking layer with a thickness from 0.1 nm to 0.5 nm, preferably based on NiCr, a second matching layer with a thickness from 10 nm to 20 nm, preferably from 13 nm to 18 nm, preferably based on zinc oxide, an anti-reflection layer with a thickness from 30 nm to 50 nm, preferably from 35 nm to 45 nm, preferably subdivided into a dielectric layer based on silicon nitride with a thickness from 18 nm to 23 nm, and an optically high-refractive-index layer based on a mixed silicon-metal nitride such as silicon-zirconium nitride or silicon-hafnium nitride with a thickness from 18 nm to 23 nm, a smoothing layer with a thickness from 5 nm to 15 nm, preferably from 8 nm to 12 nm, preferably based on mixed tin-zinc oxide, a first matching layer with a thickness from 8 nm to 18 nm, preferably from 10 nm to 15 nm, preferably based on zinc oxide, an electrically conductive layer based on silver with a thickness from 7 nm to 11 nm, preferably from 7.5 nm to 10 nm, optionally, a blocking layer with a thickness from 0.1 nm to 0.5 nm, preferably based on NiCr, a second matching layer with a thickness from 8 nm to 18 nm, preferably from 10 nm to 15 nm, preferably based on zinc oxide, an anti-reflection layer with a thickness from 25 nm to 45 nm, preferably from 30 nm to 40 nm, preferably subdivided into an optically high-refractive-index layer based on a mixed silicon-metal nitride such as silicon-zirconium nitride or silicon-hafnium nitride with a thickness from 10 nm to 15 nm and a dielectric layer based on silicon nitride with a thickness from 22 nm to 27 nm.

A most particularly preferred embodiment of the electrically conductive coating contains or consists of the following layer sequence, starting from the substrate:

an anti-reflection layer based on a mixed silicon-metal nitride such as silicon-zirconium nitride or silicon-hafnium nitride with a thickness from 20 nm to 23 nm, a smoothing layer based on mixed tin-zinc oxide with a thickness from 7 nm to 9 nm, a first matching layer based on zinc oxide with a thickness from 10 nm to 12 nm, an electrically conductive layer based on silver with a thickness from 11.5 nm to 13.5 nm, in particular from 12 nm to 13 nm, optionally, a blocking layer based on NiCr with a thickness from 0.1 nm to 0.3 nm, a second matching layer based on zinc oxide with a thickness from 15 nm to 17 nm, an anti-reflection layer based on a mixed silicon-metal nitride such as silicon-zirconium nitride or silicon-hafnium nitride with a thickness from 31 nm to 33 nm, preferably a low-refractive-index layer with a refractive index less than 1.8 based on silicon oxide with a thickness from 18 nm to 22 nm, a smoothing layer based on mixed tin-zinc oxide with a thickness from 9 nm to 11 nm, a first matching layer based on zinc oxide with a thickness from 15 nm to 17 nm, an electrically conductive layer based on silver with a thickness from 10 nm to 12.5 nm, in particular from 10 nm to 12 nm, optionally, a blocking layer based on NiCr with a thickness from 0.1 nm to 0.3 nm, a second matching layer based on zinc oxide with a thickness from 14 nm to 16 nm, an anti-reflection layer, subdivided into a dielectric layer based on silicon nitride with a thickness from 16 nm to 18 nm and an optically high-refractive-index layer based on a mixed silicon-metal nitride such as silicon-zirconium nitride or silicon-hafnium nitride with a thickness from 16 nm to 18 nm, a smoothing layer based on mixed tin-zinc oxide with a thickness from 10 nm to 12 nm, a first matching layer based on zinc oxide with a thickness from 13 nm to 15 nm, an electrically conductive layer based on silver with a thickness from 11 nm to 12.5 nm, optionally, a blocking layer based on NiCr with a thickness from 0.1 nm to 0.3 nm, a second matching layer based on zinc oxide with a thickness from 15 nm to 17 nm, an anti-reflection layer, subdivided into a dielectric layer based on silicon nitride with a thickness from 20 nm to 22 nm and an optically high-refractive-index layer based on a mixed silicon-metal nitride such as silicon-zirconium nitride or silicon-hafnium nitride with a thickness from 20 nm to 22 nm, a smoothing layer based on mixed tin-zinc oxide with a thickness from 9 nm to 11 nm,
a first matching layer based on zinc oxide with a thickness from 11 nm to 13 nm,
an electrically conductive layer based on silver with a thickness from 7.5 nm to 10 nm, in particular from 7.5 nm to 9.5 nm,
optionally, a blocking layer based on NiCr with a thickness from 0.1 nm to 0.3 nm,
a second matching layer based on zinc oxide with a thickness from 12 nm to 14 nm,
an anti-reflection layer, subdivided into an optically high-refractive-index layer based on a mixed silicon-metal nitride such as silicon-zirconium nitride or silicon-hafnium nitride with a thickness from 11 nm to 13 nm and a dielectric layer based on silicon nitride with a thickness from 24 nm to 26 nm.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.9 mm, for example, those with the standard thicknesses of 1.6 mm or 2.1 mm.

The outer pane, the inner pane, and the thermoplastic intermediate layer can be clear and colourless, but also tinted or coloured. In a preferred embodiment, the total transmittance through the composite glass is greater than 70%, based on illuminant A. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing. It must be ensured that the electrically conductive coating does not reduce the total transmittance too much.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The composite pane can be produced by methods known per se. The outer pane and the inner pane are laminated together via the intermediate layer, for example, by autoclave methods, vacuum bag methods, vacuum ring methods, calendar methods, vacuum laminators, or combinations thereof. The bonding of the outer pane and the inner pane is customarily done under the action of heat, vacuum, and/or pressure.

The electrically conductive coating is preferably applied by physical vapour deposition (PVD) onto the inner pane, particularly preferably by cathodic sputtering ("sputtering"), most particularly preferably by magnetron-enhanced cathodic sputtering ("magnetron sputtering"). In principle, however, the coating can also be applied, for example, by chemical vapour deposition (CVD), for example, plasma-enhanced vapour deposition (PECVD), by vapour deposition, or by atomic layer deposition (ALD). The coating are preferably applied to the panes prior to lamination. Instead of applying the electrically conductive coating on a pane surface, it can, in principle, also be provided on a carrier film that is arranged in the intermediate layer.

If the composite pane is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the conductive coating.

If the electrically conductive coating is to be used as a heatable coating, it must be electrically contacted so it can be connected to the voltage source, usually the on-board voltage of the vehicle. It is a particular advantage of the coating according to the invention that, due to its sheet resistance, it can be operated as a heatable coating using the usual on-board voltage of motor vehicles, in particular passenger cars, with the heating effect being sufficient for quick deicing or moisture removal. The usual on-board voltage is 12 V to 15 V, in particular approx. 14 V. For connection to the voltage source, the coating is preferably provided with bus bars, which can be connected to the poles of the voltage source in order to introduce current into the coating over as much of the pane width as possible. The bus bars can, for example, be implemented as printed and baked conductors, typically in the form of a baked screen printing paste with glass frits and silver particles. However, alternatively, strips of an electrically conductive foil that are placed or glued onto the coating can be used as bus bars, for example, copper foil or aluminium foil. Typically, the two busbars are positioned near two opposite side edges of the composite pane, for example, the upper and lower edge.

The invention also includes the use of a composite pane implemented according to the invention as a projection surface of a projection arrangement for a head-up display, wherein a projector whose radiation is p-polarised is directed at the HUD region. The above-described preferred embodiments apply mutatis mutandis to the use.

The invention further includes the use of a projection arrangement according to the invention as an HUD in a vehicle on land, on water, or in the air, preferably a motor vehicle, rail vehicle, aircraft, or watercraft, in particular a passenger car or a lorry.

In the following, the invention is explained in detail with reference to drawings and exemplary embodiments. The drawings are schematic representations and are not true to scale. The drawings in no way restrict the invention.

Figure 2:
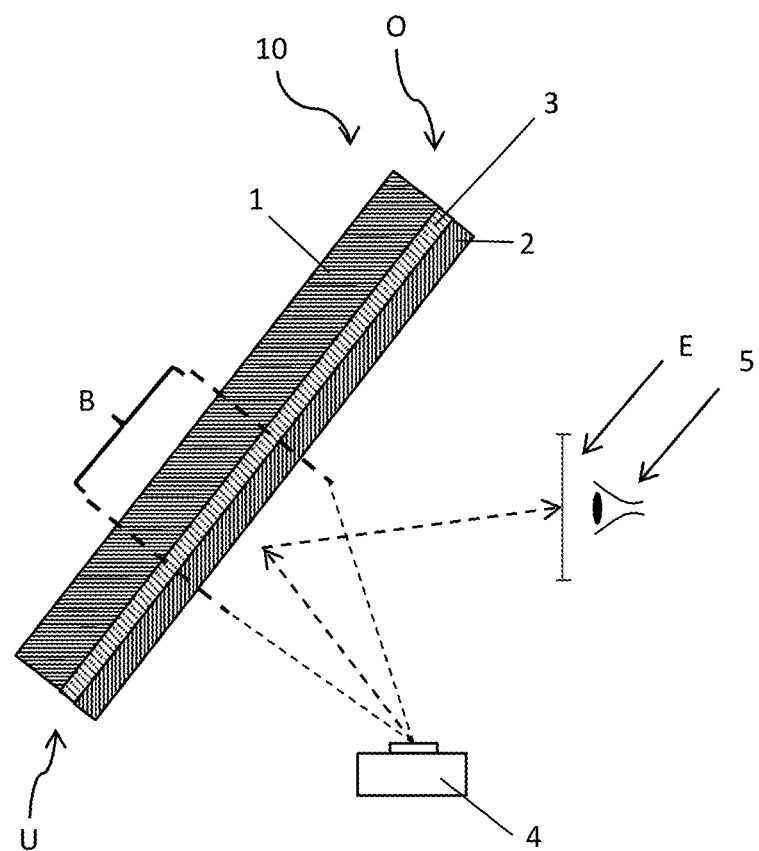
Figure 3:
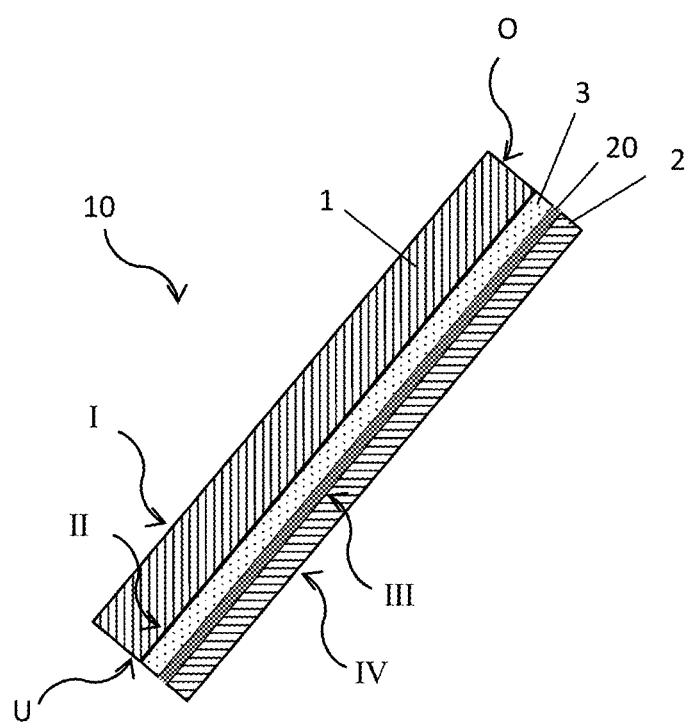
Figure 4:
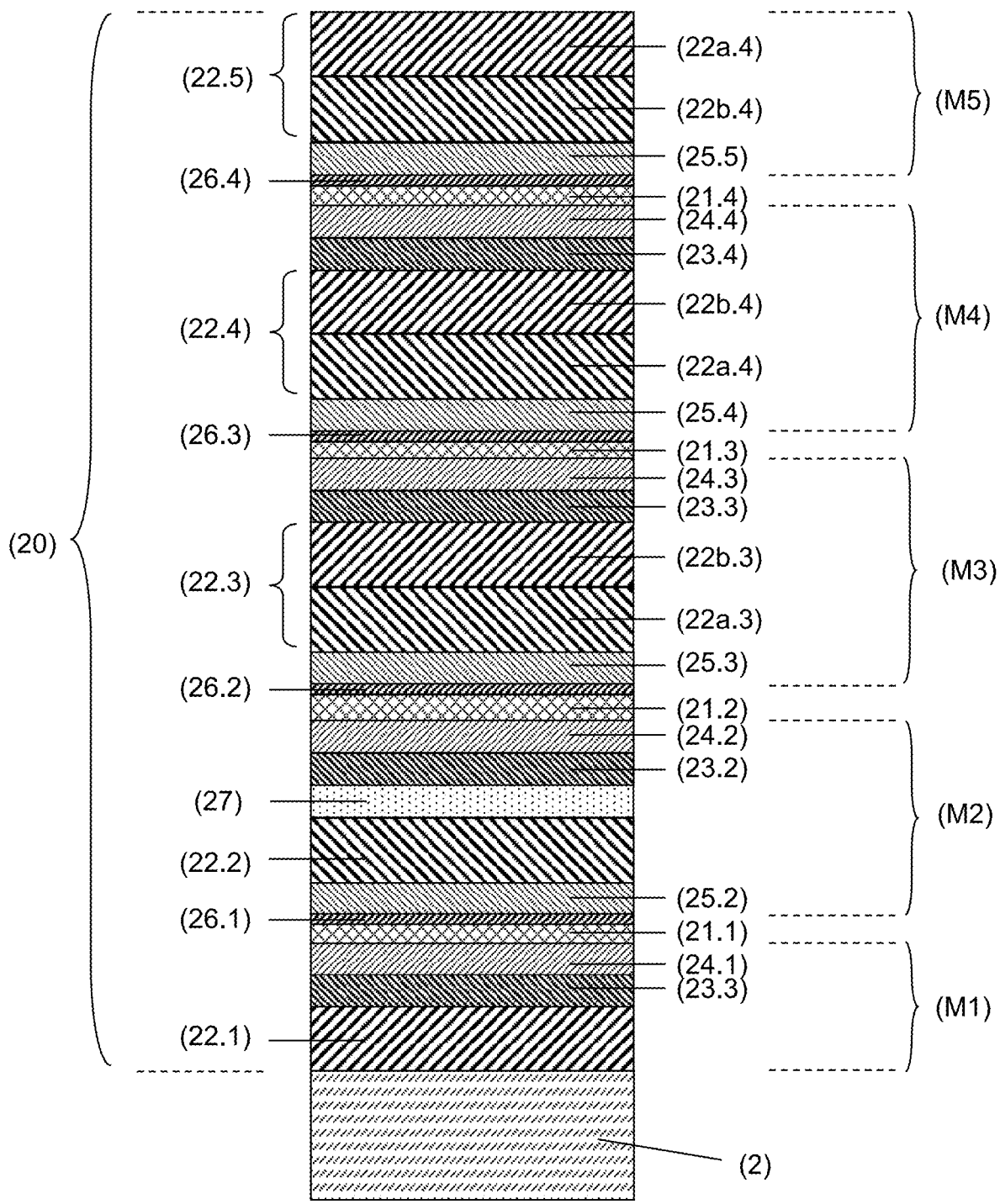
Figure 5:
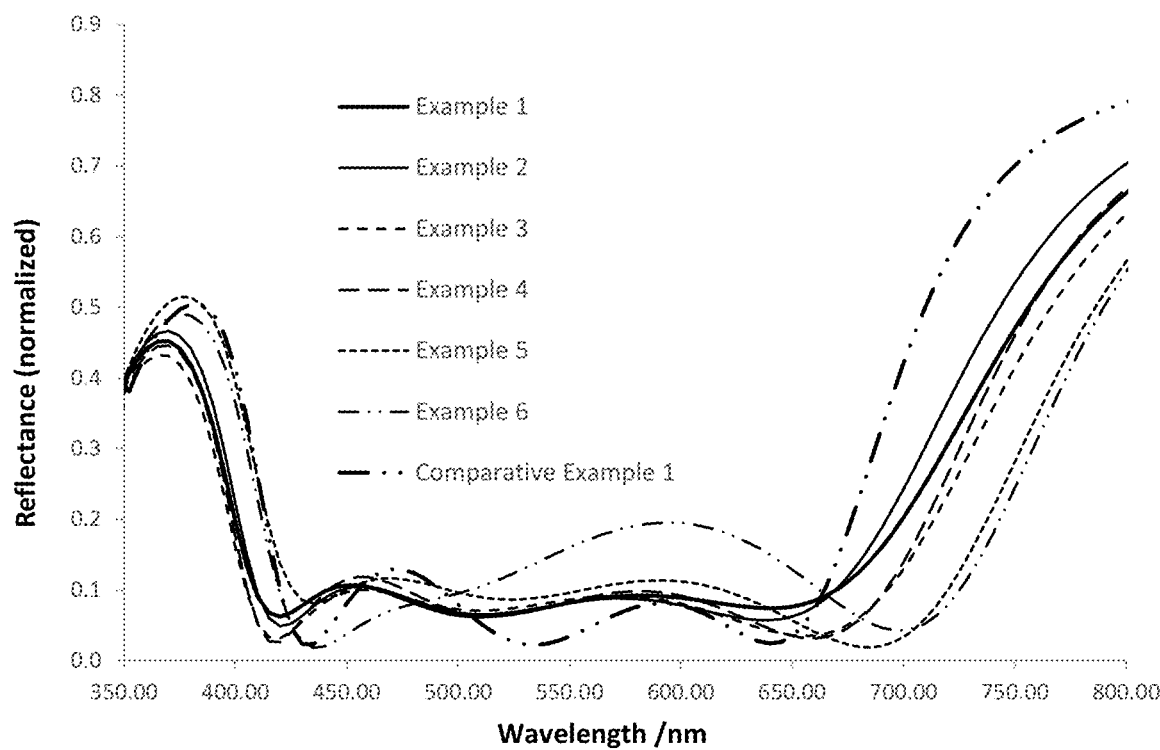
Figure 5:
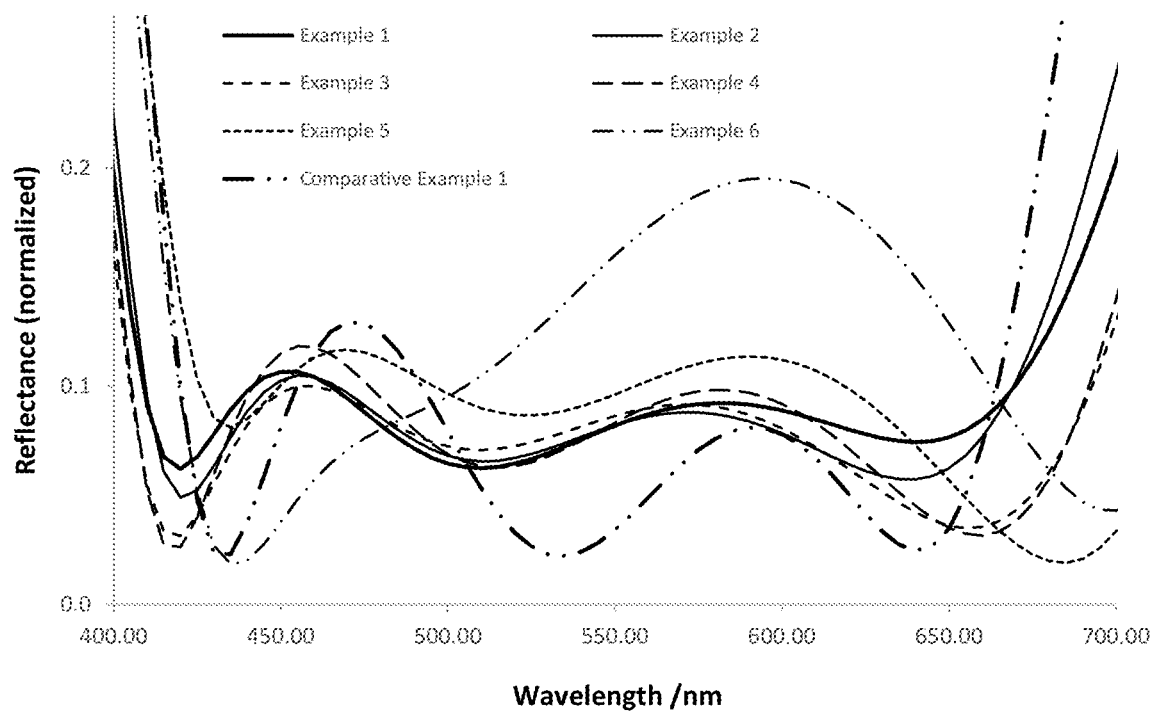

They depict:

FIG. 1 a plan view of a composite pane of a generic projection arrangement,

FIG. 2 a cross-section through a generic projection arrangement,

FIG. 3 a cross-section through a composite pane of a projection arrangement according to the invention, FIG. 4 a cross-section through an electrically conductive coating according to the invention, and FIG. 5 reflection spectrum relative to p-polarised radiation of composite panes according to the invention and of comparative examples.

FIG. 1 and FIG. 2 depict in each case a detail of a generic projection arrangement for an HUD. The projection arrangement comprises a composite pane 10, in particular the windshield of a passenger car. The projection arrangement also comprises an HUD projector 4 that is directed at a region B of the composite pane 10. In the region B, usually referred to as an HUD region, the projector 4 can generate images that are perceived by a viewer 5 (vehicle driver) as virtual images on the side of the composite pane 10 facing away from him when his eyes are situated within the so-called eyebox E.

The composite pane 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the outside surroundings; the inner pane 2, the vehicle interior.

FIG. 3 depicts an embodiment of a composite pane 10 implemented according to the invention. The outer pane 1 has an exterior-side surface I that faces the outside surroundings in the installed position and an interior-side surface II that faces the interior in the installed position. Likewise, the inner pane 2 has an exterior-side surface III that faces the outside surroundings in the installed position and an interior-side surface IV that faces the interior in the installed position. The outer pane 1 and the inner pane 2 are made, for example, of soda lime glass. The outer pane 1 has, for example, a thickness of 2.1 mm; the inner pane 2, a thickness of 1.6 mm. The intermediate layer 3 is made, for example, of a PVB film with a thickness of 0.76 mm. The PVB film has an essentially constant thickness, apart from any surface roughness common in the art.

The exterior-side surface III of the inner pane 2 is provided with an electrically conductive coating 20 according to the invention, which is provided as a reflection surface for the projector radiation and, additionally, for example, as an IR reflection coating or as a heatable coating.

According to the invention, the radiation of the projector 4 is p-polarised, in particular essentially purely p-polarised. Since the projector 4 irradiates the composite pane 10 at an angle of incidence of about 65°, which is close to Brewster's angle, the radiation of the projector is only insignificantly reflected at the external surfaces I, IV of the composite pane 10. In contrast, the electrically conductive coating 20 according to the invention is optimised for reflection of p-polarised radiation. It serves as a reflection surface for the radiation of the projector 4 to generate the HUD projection.

FIG. 4 depicts the layer sequence of an embodiment according to the invention of the electrically conductive coating 20 on the inner pane 2. The coating 20 comprises five dielectric layer sequences M1, M2, M3, M4, M5 and four electrically conductive layers 21 (21.1, 21.2, 21.3, 21.4), which are arranged alternatingly. A thin blocking layer 26 (26.1, 26.2, 26.3, 26.4) is arranged in each case between each electrically conductive layer 21 and the dielectric layer sequence positioned above it.

The first dielectric layer sequence M1 is composed of an anti-reflection layer 22.1, a smoothing layer 23.1, and a first matching layer 24.1.

The second dielectric layer sequence M2 is composed of a second matching layer 25.1, an anti-reflection layer 22.2, an optically low-refractive-index layer 27 with a refractive index less than 1.8, a smoothing layer 23.2, and a first matching layer 24.2.

The third dielectric layer sequence M3 is composed of a second matching layer 25.3, an anti-reflection layer 22.3, a smoothing layer 23.3, and a first matching layer 24.3. The anti-reflection layer 22.3 is subdivided into a dielectric layer 22a.3 with a refractive index less than 2.1 and an optically high-refractive-index layer 22b.3 with a refractive index greater than 2.1.

The fourth dielectric layer sequence M4 is composed of a second matching layer 25.4, an anti-reflection layer 22.4, a smoothing layer 23.4, and a first matching layer 24.4. Here, again, the anti-reflection layer 22.4 is subdivided into a dielectric layer 22a.4 and an optically high-refractive-index layer 22b.4.

The fifth dielectric layer sequence M5 is composed of a second matching layer 25.5 and an anti-reflection layer 22.5, with the latter again being subdivided into an optically high-refractive-index layer 22b.5 and a dielectric layer 22a.5. The optically high-refractive-index layer 22b.5 and the dielectric layer 22a.5 are arranged in reverse order compared to the dielectric layer sequences M3 and M4.

All dielectric layers except the low-refractive-index layer 27 have a refractive index greater than 1.8. The layer sequence can be seen schematically in the figure. The structure shown corresponds to Example 5 described below. The layer sequence of a composite pane 10 with the coating 20 on the exterior-side surface III of the inner pane 2 is presented, together with the materials and layer thicknesses of the individual layers, in Table 1 (Example 5). Table 1 also shows four further Examples according to the invention (Example 1 through 4).

Table 2 shows the layer sequences of an electrically conductive coating not according to the invention (Comparative Example 1) and another embodiment of the coating according to the invention (Example 6). The Comparative Example 1 differs from the Examples according to the invention in particular by the thickness of the electrically conductive layers 21, with, in particular, the second electrically conductive layer 21.2, the third electrically conductive layer 21.3, and the fourth electrically conductive layer 21.4 being significantly thicker. In addition, the optical thicknesses of the first dielectric layer sequence M1 (69.46 nm) and of the fifth dielectric layer sequence M5 (77.2 nm) are significantly lower than in the Examples according to the invention (85.52 nm for M1 and 102.4 nm for M5). The Example 6 is essentially the same as Example 5, with the low-refractive-index layer 27 provided in the third dielectric layer sequence M3 instead of in the second dielectric layer sequence M2.

The optical thickness of a layer is obtained as the product of the refractive index and the geometric layer thickness. The refractive index of silicon nitride (SiN), tin oxide (ZnO), and mixed tin-zinc oxide (ZnSnO) is 2.0 in each case; the refractive index of silicon-zirconium nitride (SiZrN) is 2.2; and the refractive index of silicon oxide (SiO) is 1.5.

The materials of the layers can have dopants that are not specified in the Table. For example, layers based on SnZnO can be doped with antimony and layers based on ZnO, SiN, or SiZrN with aluminium.

TABLE 1

| Material | Reference Characters | | | Example 1 | Example 2 | Example 3 | Example 4 | Example 5 |
|---|---|---|---|---|---|---|---|---|
| Glass | 1 | | | 2.1 mm | 2.1 mm | 2.1 mm | 2.1 mm | 2.1 mm |
| PVB | 3 | | | 0.76 mm | 0.76 mm | 0.76 mm | 0.76 mm | 0.76 mm |
| SiN | 20 | 22b.5 | 22.5 | 25.0 nm | 25.0 nm | 25.0 nm | 25.0 nm | 25.0 nm |
| SiZrN | | 22a.5 | | 12.0 nm | 12.0 nm | 12.0 nm | 12.0 nm | 12.0 nm |
| ZnO | | 25.5 | | 13.0 nm | 13.0 nm | 13.0 nm | 13.0 nm | 13.0 nm |
| NiCr | | 26.4 | | 0.2 nm | 0.2 nm | 0.2 nm | 0.2 nm | 0.2 nm |
| Ag | | 21.4 | | 7.5 nm | 8.0 nm | 8.0 nm | 9.1 nm | 8.1 nm |
| ZnO | | 24.4 | | 12.0 nm | 12.0 nm | 12.0 nm | 12.0 nm | 12.0 nm |
| SnZnO | | 23.4 | | 10.0 nm | 10.0 nm | 10.0 nm | 10.0 nm | 10.0 nm |
| SiZrN | | 22b.4 | 22.4 | 20.5 nm | 20.5 nm | 20.5 nm | 20.5 nm | 20.5 nm |
| SiN | | 22a.4 | | 20.9 nm | 20.9 nm | 20.9 nm | 20.9 nm | 20.9 nm |
| ZnO | | 25.4 | | 16.0 nm | 16.0 nm | 16.0 nm | 16.0 nm | 16.0 nm |
| NiCr | | 26.3 | | 0.1 nm | 0.1 nm | 0.1 nm | 0.1 nm | 0.1 nm |
| Ag | | 21.3 | | 11.0 nm | 12.0 nm | 12.0 nm | 12.5 nm | 12.3 nm |
| ZnO | | 24.3 | | 14.0 nm | 14.0 nm | 14.0 nm | 14.0 nm | 14.0 nm |
| SnZnO | | 23.3 | | 11.0 nm | 11.0 nm | 11.0 nm | 11.0 nm | 11.0 nm |
| SiZrN | | 22b.3 | 22.3 | 18.0 nm | 18.0 nm | 18.0 nm | 18.0 nm | 18.0 nm |
| SiN | | 22a.3 | | 17.1 nm | 17.1 nm | 17.1 nm | 17.1 nm | 17.1 nm |
| ZnO | | 25.3 | | 15.0 nm | 15.0 nm | 15.0 nm | 15.0 nm | 15.0 nm |
| NiCr | | 26.2 | | 0.3 nm | 0.3 nm | 0.3 nm | 0.3 nm | 0.3 nm |
| Ag | | 21.2 | | 11.5 nm | 11.9 nm | 10.6 nm | 10.9 nm | 10.3 nm |
| ZnO | | 24.2 | | 16.0 nm | 16.0 nm | 16.0 nm | 16.0 nm | 16.0 nm |
| SnZnO | | 23.2 | | 10.0 nm | 10.0 nm | 10.0 nm | 10.0 nm | 10.0 nm |
| SiO | | 27 | | — | — | — | — | 20.0 nm |
| SiZrN | | 22.2 | | 32.1 nm | 32.1 nm | 32.1 nm | 32.1 nm | 32.1 nm |
| ZnO | | 25.2 | | 16.0 nm | 16.0 nm | 16.0 nm | 16.0 nm | 16.0 nm |
| NiCr | | 26.1 | | 0.2 nm | 0.2 nm | 0.2 nm | 0.2 nm | 0.2 nm |
| Ag | | 21.1 | | 13.0 nm | 13.0 nm | 12.0 nm | 12.2 nm | 12.5 nm |
| ZnO | | 24.1 | | 11.0 nm | 11.0 nm | 11.0 nm | 11.0 nm | 11.0 nm |
| ZnSnO | | 23.1 | | 8.0 nm | 8.0 nm | 8.0 nm | 8.0 nm | 8.0 nm |
| SiZrN | | 22.1 | | 21.6 nm | 21.6 nm | 21.6 nm | 21.6 nm | 21.6 nm |
| Glass | 2 | | | 1.6 mm | 1.6 mm | 1.6 mm | 1.6 mm | 1.6 mm |

TABLE 2

| Material | Reference Characters | | | Comparative Example 1 | Example 6 |
|---|---|---|---|---|---|
| Glass | 1 | | | 2.1 mm | 2.1 mm |
| PVB | 3 | | | 0.76 mm | 0.76 mm |
| SiN | 20 | 22b.5 | 22.5 | 12.4 nm | 25.0 nm |
| SiZrN | | 22a.5 | | 12.0 nm | 12.0 nm |
| ZnO | | 25.5 | | 13.0 nm | 13.0 nm |
| NiCr | | 26.4 | | 0.2 nm | 0.2 nm |
| Ag | | 21.4 | | 13.2 nm | 8.1 nm |
| ZnO | | 24.4 | | 12.0 nm | 12.0 nm |
| SnZnO | | 23.4 | | 10.0 nm | 10.0 nm |
| SiZrN | | 22b.4 | 22.4 | 20.4 nm | 20.5 nm |
| SiN | | 22a.4 | | 21.2 nm | 20.9 nm |
| ZnO | | 25.4 | | 16.0 nm | 16.0 nm |
| NiCr | | 26.3 | | 0.1 nm | 0.1 nm |
| Ag | | 21.3 | | 14.3 nm | 12.3 nm |
| ZnO | | 24.3 | | 14.0 nm | 14.0 nm |
| SnZnO | | 23.3 | | 11.0 nm | 11.0 nm |
| SiO | | 27 | | — | 20 nm |
| SiZrN | | 22b.3 | 22.3 | 18.3 nm | 18.0 nm |
| SiN | | 22a.3 | | 17.3 nm | 17.1 nm |
| ZnO | | 25.3 | | 15.0 nm | 15.0 nm |
| NiCr | | 26.2 | | 0.3 nm | 0.3 nm |
| Ag | | 21.2 | | 14.8 nm | 10.3 nm |
| ZnO | | 24.2 | | 16.0 nm | 16.0 nm |
| SnZnO | | 23.2 | | 10.0 nm | 10.0 nm |
| SiZrN | | 22.2 | | 33.0 nm | 32.1 nm |
| ZnO | | 25.2 | | 16.0 nm | 16.0 nm |
| NiCr | | 26.1 | | 0.2 nm | 0.2 nm |
| Ag | | 21.1 | | 11.7 nm | 12.5 nm |
| ZnO | | 24.1 | | 11.0 nm | 11.0 nm |
| ZnSnO | | 23.1 | | 8.0 nm | 8.0 nm |
| SiZrN | | 22.1 | | 14.3 nm | 21.6 nm |
| Glass | 2 | | | 1.6 mm | 1.6 mm |

FIG. 5 depicts the reflection spectrum of a composite pane 10 in accordance with the Examples 1 to 6 according to the invention and the Comparative Example 1 relative to p-polarised radiation. The spectra were measured on the interior side at an angle of incidence of 65°, thus replicating the reflection behaviour for the HUD projector. The upper spectrum shows the spectral range from 350 nm to 800 nm; the lower spectrum enlarges the spectral range from 400 nm to 700 nm. The two representations of the figure differ only in the scaling of the ordinate.

The comparison of the Examples 1 through 4 with the Comparative Example 1 makes it clear that the layer thicknesses according to the invention, in particular of the electrically conductive layers 21, result in a higher average reflectance and a smoother spectrum in the spectral range from 450 nm to 650 nm relevant for the HUD display. Thus, a more intense and colour-neutral display of the HUD projection is obtained. The low-refractive-index layer 27 (Examples 5 and 6) can further increase the average reflectance. Here, it is advantageous for the low-refractive-index layer 27 to be arranged in the layer sequence M2 (Example 5)—if it is contained in the layer sequence M3 (Example 6), a high average reflectance also occurs; however, the spectrum is somewhat red-heavy. The relevant observations are summarised in Table 3.

TABLE 3

|  | Averaged reflectance relative to p-polarised radiation, 450 nm-650 nm | Difference between the maximally occurring reflectance and the mean, 450 nm-650 nm | Difference between the minimally occurring reflectance and the mean, 450 nm-650 nm |
|---|---|---|---|
| Example 1 | 8.2% | 2.5% | 1.9% |
| Example 2 | 7.8% | 2.7% | 2.0% |
| Example 3 | 7.8% | 2.3% | 4.1% |
| Example 4 | 8.2% | 3.7% | 4.2% |
| Example 5 | 9.9% | 1.8% | 4.2% |
| Example 6 | 13.7% | 5.9% | 9.9% |
| Comparative Example 1 | 6.5% | 6.4% | 4.3% |

Table 4 and Table 5 indicate some physical parameters of the composite panes according to the invention (Examples) and the Comparative Example according to Tables 1 and 2 that are familiar to the person skilled in the art and are usually used to characterise vehicle windows. RL stands for the integrated light reflection; and TL, for the integrated light transmittance (per ISO 9050). The specification after RL or TL respectively indicates the light source used, where A is the light source A and HUD is an HUD projector with radiation wavelengths of 473 nm, 550 nm, and 630 nm (RGB). The angle specification after the light type indicates the angle of incidence of the radiation relative to the exterior-side surface normals. Angles of incidence less than 90° thus indicate exterior-side irradiation; and angles of incidence greater than 90°, interior-side irradiation. The specified angle of incidence of 115° corresponds to an angle of incidence relative to the interior-side surface normal of 65° (=180°-115°) simulates irradiation with the projector according to the invention. Below the reflection values are the associated colour values a* and b* in the L*a*b* colour space, followed by the indication of the light source used (HUD projector) and the indication of the viewing angle (angle at which the light beam enters the eye and strikes the retina).

The composite pane has sufficient total transmittance to be used as a windshield. The interior-side reflection with respect to the p-polarised HUD projector radiation is sufficiently high to ensure high intensity HUD projection. At the same time, the reflection colour is relatively neutral such that the HUD projection is reproduced in a colour-neutral manner.

TABLE 4

|  | Example 1 | Example 2 | Example 3 | Example 4 | Example 5 |
|---|---|---|---|---|---|
| TL A 0°/% | 71.6 | 71.3 | 71.2 | 71.3 | 71.2 |
| RL HUD p-pol. 115°/% | 8.3 | 7.8 | 7.9 | 8.1 | 9.9 |
| a* (HUD/10°) | 5.5 | 1.6 | −2.3 | 2.2 | 2.2 |
| b* (HUD/10°) | −4.0 | −3.7 | −0.8 | −4.0 | −3.3 |
| Sheet Resistance/ Ω/square | 0.9 | 0.9 | 0.9 | 0.9 | 0.9 |

TABLE 5

|  | Comparative Example 1 | Example 6 |
|---|---|---|
| TL A 0°/% | 71.7 | 64.3 |
| RL HUD p-pol. 115°/% | 5.7 | 16.3 |
| a* (HUD/10°) | 8.2 | 2.4 |
| b* (HUD/10°) | −12.6 | 27.5 |
| Sheet Resistance/ Ω/square | 0.7 | 0.9 |

LIST OF REFERENCE CHARACTERS (10) composite pane
(1) outer pane
(2) inner pane
(3) thermoplastic intermediate layer
(4) HUD projector
(5) viewer/vehicle driver
(20) electrically conductive coating
(M1), (M2), (M3), (M4), (M5) 1st, 2nd, 3rd, 4th, 5th dielectric layer sequence
(21) electrically conductive layer
(21.1), (21.2), (21.3), (21.4) 1st, 2nd, 3rd, 4th electrically conductive layer
(22) anti-reflection layer
(22.1), (22.2), (22.3), (22.4), (22.5) 1st, 2nd, 3rd, 4th, 5th anti-reflection layer
(22a) dielectric layer of the anti-reflection layer 4
(22a.3), (22a.4), (22a.5) 1st, 2nd, 3rd dielectric layer
(22b) optically high-refractive-index layer of the anti-reflection layer 4
(22b.3), (22b.4), (22b.5) 1st, 2nd, 3rd optically high-refractive-index layer
(23) smoothing layer
(23.1), (23.2), (23.3), (23.4) 1st, 2nd, 3rd, 4th smoothing layer
(24) first matching layer
(24.1), (24.2), (24.3), (24.4) 1st, 2nd, 3rd, 4th first matching layer
(25) second matching layer
(25.2), (25.3), (25.4), (25.5) 1st, 2nd, 3rd, 4th second matching layer
(26) blocking layer
(26.1), (26.2), (26.3), (26.4) 1st, 2nd, 3rd, 4th blocking layer
(27) optically low-refractive-index layer
(O) upper edge of the composite pane 10
(U) lower edge of the composite pane 10
(B) HUD region of the composite pane 10
(E) eyebox
(I) exterior-side surface of the outer pane 1
(II) interior-side surface of the outer pane 1
(III) exterior-side surface of the inner pane 2
(IV) interior-side surface of the inner pane 2

The invention claimed is:

1. A projection arrangement for a head-up display (HUD), comprising:
a composite pane, which comprises an outer pane and an inner pane joined to one another via a thermoplastic intermediate layer and has an HUD region;
an electrically conductive coating on a surface of the outer pane or the inner pane facing the intermediate layer or within the intermediate layer; and
an HUD projector, which is directed at the HUD region;
wherein a radiation of the projector is p-polarised,
wherein the electrically conductive coating comprises a first dielectric layer or layer sequence, a first electrically conductive layer with a thickness from 11 nm to 14 nm,
a second dielectric layer or layer sequence,
a second electrically conductive layer with a thickness from 10 nm to 13 nm,
a third dielectric layer or layer sequence,
a third electrically conductive layer with a thickness from 10 nm to 13 nm,
a fourth dielectric layer or layer sequence,
a fourth electrically conductive layer with a thickness from 7 nm to 11 nm, and
a fifth dielectric layer or layer sequence,
which are arranged in the order specified starting from a substrate of the composite pane.

2. The projection arrangement according to claim 1, wherein the thickness of the first electrically conductive layer is greater than the thickness of the fourth electrically conductive layer.

3. The projection arrangement according to claim 1, wherein
the thickness of the first electrically conductive layer is from 11.5 nm to 13.5 nm,
the thickness of the second electrically conductive layer is from 10 nm to 12.5 nm,
the thickness of the third electrically conductive layer is from 11 nm to 12.5 nm, and
the thickness of the fourth electrically conductive layer is from 7.5 nm to 10 nm.

4. The projection arrangement according to claim 1, wherein
an optical thickness of the first dielectric layer or layer sequence is from 50 nm to 150 nm,
an optical thickness of the fifth dielectric layer or layer sequence is from 50 nm to 150 nm.

5. The projection arrangement according to claim 1, wherein all dielectric layers or layer sequences of the electrically conductive coating are formed from dielectric layers with a refractive index greater than 1.8.

6. The projection arrangement according to claim 1, wherein the second dielectric layer sequence contains a dielectric optically low-refractive-index layer with a refractive index less than 1.8 and at least one dielectric layer with a refractive index greater than 1.8 and wherein the remaining dielectric layers or layer sequences of the electrically conductive coating are formed from dielectric layers with a refractive index greater than 1.8.

7. The projection arrangement according to claim 6, wherein an optical thickness of the optically low-refractive-index layer is from 20 nm to 40 nm.

8. The projection arrangement according to claim 5, wherein a sum of optical thicknesses of all layers with a refractive index greater than 1.8 of each of the second dielectric layer or layer sequence, of the third dielectric layer or layer sequence, and of the fourth dielectric layer or layer sequence is in each case from 100 nm to 200 nm.

9. The projection arrangement according to claim 1, wherein the composite pane with the electrically conductive coating has, in a spectral range from 450 nm to 650 nm, an averaged reflectance relative to p-polarised radiation of at least 5%.

10. The projection arrangement according to claim 1, wherein a difference between a maximally occurring reflectance and a mean of a reflectance as well as a difference between a minimally occurring reflectance and a mean of the reflectance relative to p-polarised radiation in a spectral range from 450 nm to 650 nm is at most 5%.

11. The projection arrangement according to claim 1, wherein the electrically conductive layers are based on silver.

12. The projection arrangement according to claim 1, wherein the radiation of the projector is purely p-polarised.

13. The projection arrangement according to claim 1, wherein a surface of the outer pane and of the inner pane facing away from the intermediate layer are arranged parallel to one another.

14. The projection arrangement according to claim 1, wherein the electrically conductive coating is provided with two bus bars that are connected to a voltage source of 12 V to 14 V such that an electric current can be conducted through the coating to heat the composite pane.

15. A method comprising providing a projection arrangement according to claim 1 as an HUD in a vehicle on land, on water, or in the air.

16. The projection arrangement according to claim 2, wherein the thicknesses of the second electrically conductive layer and of the third electrically conductive layer are greater than the thickness of the fourth electrically conductive layer.

17. The projection arrangement according to claim 4, wherein
the optical thickness of the first dielectric layer or layer sequence is from 90 nm to 110 nm,
the optical thickness of the fifth dielectric layer or layer sequence is from 75 nm to 95 nm.

18. The projection arrangement according to claim 7, wherein the optical thickness of the optically low-refractive-index layer is from 25 nm to 35 nm.

19. The projection arrangement according to claim 8, wherein the sum of the optical thicknesses of all layers with a refractive index greater than 1.8 of each of the second dielectric layer or layer sequence, of the third dielectric layer or layer sequence, and of the fourth dielectric layer or layer sequence is in each case from 150 nm to 170 nm.

20. The projection arrangement according to claim 9, wherein the composite pane with the electrically conductive coating has, in the spectral range from 450 nm to 650 nm, an averaged reflectance relative to p-polarised radiation of at least 7%.

* * * * *